United States Patent [19]

Hatori et al.

[11] Patent Number: 4,920,426

[45] Date of Patent: Apr. 24, 1990

[54] IMAGE CODING SYSTEM CODING DIGITAL IMAGE SIGNALS BY FORMING A HISTOGRAM OF A COEFFICIENT SIGNAL SEQUENCE TO ESTIMATE AN AMOUNT OF INFORMATION

[75] Inventors: Yoshinori Hatori, Kanagawa; Toshio Koga, Tokyo; Kiichi Matsuda; Naoki Mukawa, both of Kanagawa, all of Japan

[73] Assignees: Kokusai Denshin Denwa Co., Ltd.; NEC Corporation; Fujitsu Limited; Nippon Telegraph and Telephone Corporation, all of Tokyo, Japan

[21] Appl. No.: 118,128

[22] Filed: Nov. 9, 1987

[30] Foreign Application Priority Data

Nov. 10, 1986 [JP] Japan .................. 61-267340

[51] Int. Cl.⁵ ............... H04N 1/415; H04N 1/413
[52] U.S. Cl. .................. 358/433; 358/133; 358/430
[58] Field of Search ........... 358/261, 133, 135, 136, 358/260, 261.1, 261.2, 261.3, 261.4, 426, 427, 428, 429, 430, 431, 432, 433

[56] References Cited

U.S. PATENT DOCUMENTS

| | | | |
|---|---|---|---|
| 4,196,448 | 4/1980 | Whitehouse et al. | 358/260 |
| 4,200,886 | 4/1980 | Musmann et al. | 358/260 |
| 4,386,366 | 5/1983 | Mori | 358/260 |
| 4,504,860 | 3/1985 | Nicol et al. | 358/260 |
| 4,580,162 | 4/1986 | Mori | 358/261 |
| 4,581,638 | 4/1986 | Chiariglione et al. | 358/260 |
| 4,698,672 | 10/1987 | Chen et al. | 358/136 |

FOREIGN PATENT DOCUMENTS

| | | | |
|---|---|---|---|
| 57-99885 | 6/1982 | Japan . | |
| 59-61278 | 4/1984 | Japan | 358/260 |
| 59-61279 | 4/1984 | Japan | 358/260 |
| 62-154987 | 7/1987 | Japan . | |

OTHER PUBLICATIONS

Andrew G. Tescher, "Rate Adaptive Communication", *National Telecommunications Conference Record*, IEEE, 1978, pp. 19.1.1–19.1.6.
Wen—Hsiung Chen et al., "Scene Adaptive Encoder", *IEEE Transactions on Communications*, vol. COM—32, No. 3, Mar. 1984, pp. 225–232.
Naoki Mukawa et al., "An Interframe Coding System for Video Teleconferencing Signal Transmission at a 1.5 Mbit/s Rate", *IEEE Transactions on Communications*, vol. Com—32, No. 3, Mar. 1984, pp. 280–287.

*Primary Examiner*—James J. Groody
*Assistant Examiner*—Randall S. Svihla
*Attorney, Agent, or Firm*—Sughrue, Mion, Zinn, Macpeak & Seas

[57] ABSTRACT

In an image coding system having a plurality of coding characteristics, such as quantization characteristics, information of a digital image signal sequence is monitored in each of a number of predetermined intervals by forming a histogram of a sequence of coefficients which is calculated from the digital image signal sequence in accordance with each of the coding characteristics. The amount of information is calculated by summing up the coefficients in relation to every one of the coding characteristics. An optimum one of the coding characteristics is indicated by the coding control circuit to code the coefficient sequence into a sequence of coded signals in accordance with the optimum coding characteristic. The coefficient sequence in each frame may be divided into a sequence of blocks each of which is judged to be either valid or invalid in relation to each coding characteristic. Results of judgement may be included in the amount of information.

5 Claims, 7 Drawing Sheets

| QUANTIZATION INDICES | VARIABLE LENGTH CODES | BIT LENGTH |
|---|---|---|
| 0 | 1 | 1 |
| EOB | 001 | 3 |
| 1 | 010 | 3 |
| -1 | 011 | 3 |
| 2 | 00010 | 5 |
| -2 | 00011 | 5 |
| 3 | 000010 | 6 |
| -3 | 000011 | 6 |
| 4 | 0000010 | 7 |
| -4 | 0000011 | 7 |
| 5 | 00000010 | 8 |
| -5 | 00000011 | 8 |
| 6 | 000000010 | 9 |
| -6 | 000000011 | 9 |
| 7 | 0000000011111110 | 16 |
| -7 | 0000000011111111 | 16 |
| 8 | 0000000011111100 | 16 |
| -8 | 0000000011111101 | 16 |
| 9 | 0000000011111010 | 16 |
| -9 | 0000000011111011 | 16 |
| 10 | 0000000011111000 | 16 |
| -10 | 0000000011111001 | 16 |
| ⋮ | ⋮ | ⋮ |
| -68 | 0000000010000101 | 16 |
| 69 | 0000000010000010 | 16 |
| -69 | 0000000010000011 | 16 |

FIG.4

IMAGE CODING SYSTEM CODING DIGITAL IMAGE SIGNALS BY FORMING A HISTOGRAM OF A COEFFICIENT SIGNAL SEQUENCE TO ESTIMATE AN AMOUNT OF INFORMATION

BACKGROUND OF THE INVENTION

This invention relates to an image coding system for use in coding a sequence of image signals, such as a television signal or a facsimile signal, into a sequence of coded signals. It is to be noted that each of the image signal sequence and the coded signal sequence is produced in a digital form.

A wide variety of algorithms have been used in a conventional coding system so as to code a sequence of image signals into a sequence of coded signals and to reduce an amount of transmission information carried by the coded signal sequence. In this event, the coded signal sequence has been transmitted to a decoding system through a transmission line or path with a transmission rate kept unchanged. Specifically, such a conventional coding system may be a predictive coding system, an orthogonal coding system, a vector quantization system and may be called a high efficiency coding system because the image signal sequence can be transmitted with a high efficiency.

In order to establish such a high efficiency coding system, a plurality of coding characteristics, such as quantization characteristics, may be switched from one to another by the use of a coding control circuit which carries out a coding control operation in response to the image signal sequence and which selects either one of the coding characteristics. It is known in the art that the coding control operation is of very importance on achieving a high quality of a reproduced image or picture.

In an article contributed to IEEE Transactions on Communications, Vol. COM-32, No. 3, March 1984 (page 280–page 287), by Naoki Mukawa et al, a coding control operation is carried out in an image coding system which comprises a quantizer and a buffer memory. More particularly, the quantizer has a plurality of quantization characteristics as the coding characteristics and quantizes the image signal sequence into a sequence of quantized signals in accordance with a selected one of the quantization characteristics. The quantized signals are successively coded into coded signals and stored in the buffer memory which is occupied by the coded signals. During the coding control operation, an amount of the coded signals is monitored and is fed back to the quantizer. As a result, the quantization characteristics are varied in the quantizer from one to another with reference to the amount of coded signals stored in the buffer memory. Thus, the coding control operation is carried out in a feedback manner in the image coding system.

Herein, it is to be noted that consideration is made about avoiding overflow and underflow of the buffer memory by controlling an amount of information stored in the buffer memory. Such control of the amount of information can be carried out, for example, by making a current one of the quantization characteristics rough and fine when the amount of information becomes large and small in the buffer memory, respectively.

As mentioned above, the current quantization characteristic is controlled with reference to an amount of previous information to vary a distortion of quantization. This means that an amount of information is liable to be excessively increased or decreased and that such an excessive increase or decrease is often repeated in the buffer memory. As a result, an occupied area of the buffer memory is repeatedly drastically decreased or increased. Such repeat of a decrease and increase inevitably brings about alternate appearance of a degraded area and a non-degraded area on a reproduced image and results in serious degradation of an image quality.

On the other hand, a coding control operation of a feed forward type is proposed by A. G. Tescher in National Telecommunications Conference Record, 1978, 19.1.1 under the title of "Rate adaptive communication." In this event, measurement is made about an amount of information to be coded. Such information is subjected to quantization into a sequence of quantized signals so that a predetermined transmission rate can be accomplished. The quantized signal sequence is thereafter coded into a coded signal sequence of the predetermined transmission rate. With this method, stable control is possible because the information to be coded is directly controlled. No degradation of the picture quality occurs due to instability of coding control operation. However, such a coding control operation can not be carried out in real time manner because the predetermined transmission rate can not be achieved without a long delay time.

In Unexamined Japanese Patent Publication No. 99,855/1982, an amount of information is estimated in consideration of electric power of a differential signal between two adjacent frames to produce an estimation value. Either one of coding characteristics is selected by the use of the estimation value. However, such an estimation value is very low in precision of estimation because an amount of information is not directly measured from the information to be coded. This results in instability of operation in a coding system.

In Unexamined Japanese Patent Publication No. 154,987/1987, a coding system is proposed wherein orthogonal transform is carried out so as to transform a sequence of image signals into a sequence of transform coefficients. The transform coefficients are coded into a sequence of coded signals by the use of bit allocation tables which define different coding characteristics. A coding control operation is made so as to change the bit allocation tables from one to another. With this system, it is difficult to change the coding characteristics insofar as the bit allocation tables are not switched from one to another. Therefore, such a coding system is not applied to a system which need not any bit allocation table and which may be, for example, a scene adaptive coder proposed by W. Chen in IEEE Transactions on Communications, Vol. COM-32, No. 3, March 1984.

SUMMARY OF THE INVENTION

It is an object of this invention to provide an image coding system which can carry out coding control operation useful for coding a sequence of image signals with a high efficiency without degradation of a reproduced picture quality.

It is another object of this invention to provide an image coding system of the type described, wherein the coding control operation can be carried out in real time and is therefore helpful for rapidly coding the image signal sequence.

It is a further object of this invention to provide an image coding system of the type described, wherein an amount of information to be coded can be estimated with a high precision.

It is still another object of this invention to provide an image coding system of the type described, wherein no bit allocation table is necessary so as to code the image signal sequence.

An image coding system to which this invention is applicable is for use in coding a sequence of digital image signals into a sequence of coded signals on a basis of predetermined intervals of time. The image coding system comprises dividing means responsive to the digital image signal sequence for dividing the digital image signal sequence into a sequence of blocks in the respective predetermined intervals, converting means coupled to the dividing means for successively carrying out predetermined conversion of the digital image signals of the blocks in the respective predetermined intervals to produce a sequence of coefficient signals representative of coefficients resulting from the predetermined conversion, controllable coding means which has a plurality of coding characteristics and which is responsive to the coefficient signal sequence and to a characteristic selection signal for coding the coefficient signal sequence into the coded signal sequence in accordance with a selected one of the coding characteristics that is indicated by the characteristic selection signal, coding control means responsive to the coefficient signal sequence for producing a coding control signal determined in relation to an amount of information carried by the coefficient signal sequence, and supplying means for supplying the coding control signal to the controllable coding means as the characteristic selection signal. According to this invention, the coding control means comprises histogram forming means responsive to the coefficient signal sequence for forming a histogram representative of a distribution of said coefficients in the respective predetermined intervals. The histogram forming means produces a histogram signal representative of the histogram. The histogram forming means further comprises estimating means coupled to the histogram forming means and responsive to the histogram signal for estimating the amount of information carried by the coefficient signal sequence in every one of the predetermined intervals to produce, as the coding control signal, an estimation signal representative of a result of the estimation in every one of the predetermined intervals. The supplying means is for supplying the estimation signal to the coding means as the coding control signal.

BRIEF DESCRIPTION OF THE DRAWING

FIG. 4 is a table for use in describing a coding operation of the coding system illustrated in FIG. 1;

DESCRIPTION OF THE PREFEERED EMBODIMENT

Figure 1:
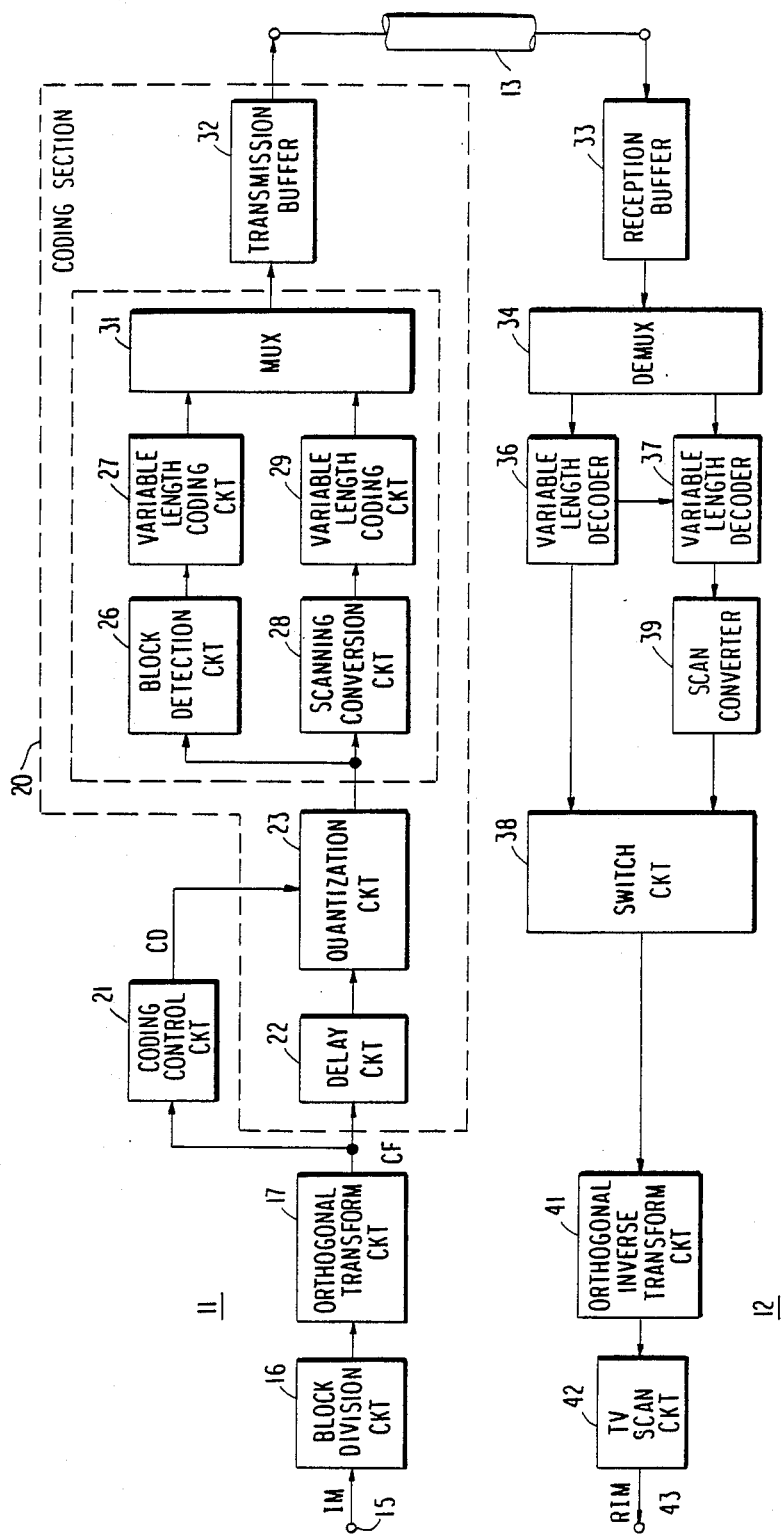
FIG. 1 is a block diagram which comprises a coding system according to a preferred embodiment of this invention and a decoding system communicable with the coding system.

Referring to FIG. 1, a total transmission system comprises a coding system 11 according to an embodiment of this invention and a decoding system 12 coupled to the coding system 11 through a transmission line or path 13. The coding system 11 is supplied through a video input terminal 15 with a sequence of digital image signals (will simply be called image signals hereinafter) IM which may be made to correspond to picture elements, respectively. It is mentioned here that the image signal sequence IM is divisible into a succession of frames each of which lasts a predetermined interval of time. The image signals IM for each frame can form a scene on a display unit (not shown) on reproduction.

The image signal sequence IM is sent to a block division circuit 16. The block division circuit 16 divides the image signals IM of the respective frames into a plurality of blocks each of which may convey, for example, picture elements of $A \times B$, where A and B represent the numbers of the picture elements vertically and horizontally arranged on the display unit, respectively. Such division of each frame into the blocks is possible by the use of a memory and an address control circuit (not shown) in a known manner. More specifically, the image signal sequence IM is successively stored in the memory of the block division circuit 16 and is successively scanned or read out of the memory at every one of the blocks by the address control circuit. This means that the division of each frame into the blocks can be made in the block division circuit 16 by converting a scanning operation of producing the image signal sequence IM into another scanning operation of obtaining a sequence of blocks.

Figure 2C:
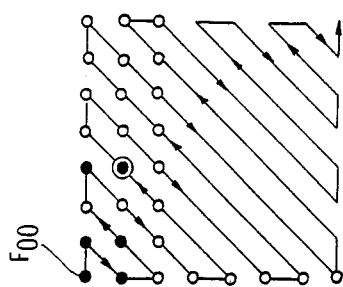
FIG. 2 is a view for use in describing scanning operations carried out in the coding system illustrated in FIG. 1.
Figure 2B:
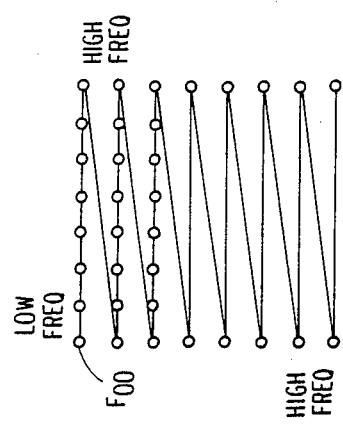
Figure 2A:
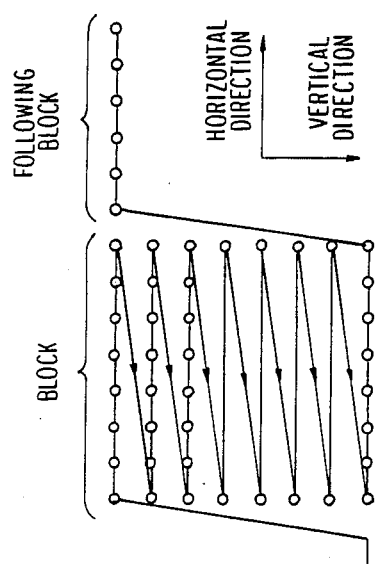
Figure 3D:
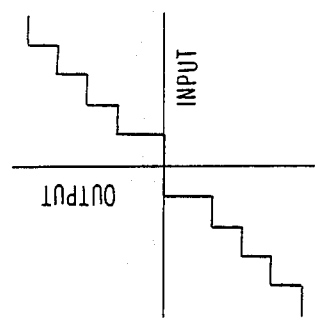
FIG. 3 is a graphical representation of quantization characteristics which can be selected in the coding system illustrated in FIG. 1.
Figure 3C:
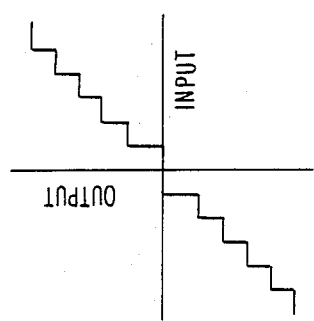
Figure 3B:
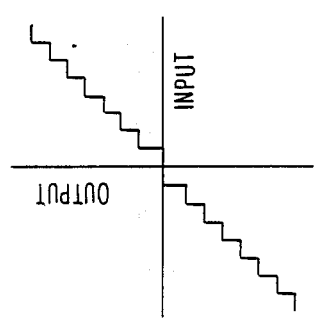
Figure 3A:
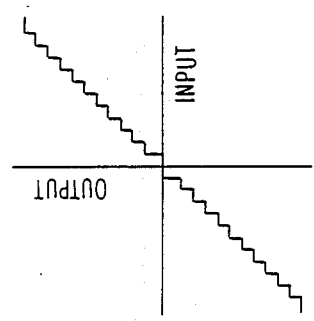
Figure 3H:
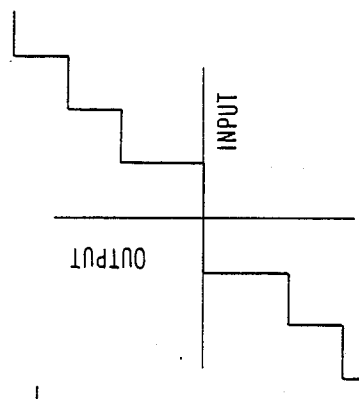
Figure 3G:
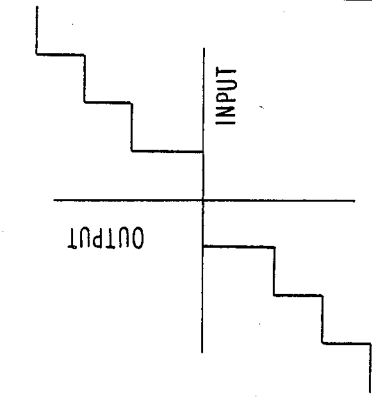
Figure 3F:
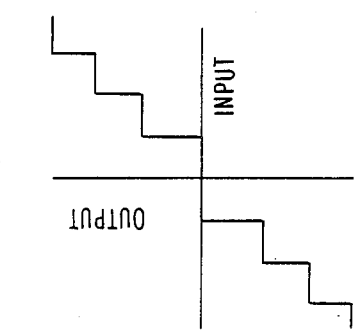
Figure 3E:
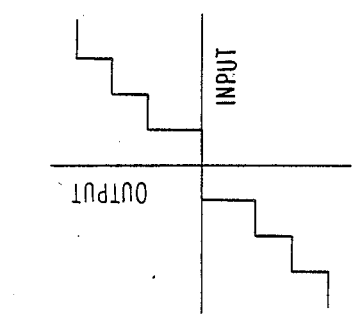

Temporarily referring to FIG. 2(A), the picture elements depicted at white dots are stored as the image signal sequence IM in the memory of the block division circuit 16 along a horizontal direction and a vertical direction and are successively divided into the blocks as shown in FIG. 2(A). Each block is formed by partially cutting the picture elements stored in the memory. For this purpose, the picture elements are partially scanned in the memory by the use of the address control circuit and read out of the memory in the form of a sequence of the blocks. Herein, consideration will be made about the block sequence which appears for every one of the predetermined intervals of time hereinafter.

Referring back to FIG. 1, each of the blocks is successively delivered from the block division circuit 16 to an orthogonal transform circuit 17 which can carry out two-dimensional orthogonal transform of the picture elements in every one of the predetermined intervals. Such orthogonal transform may be discrete cosine transform which will be abbreviated to DCT. In this event, the picture elements of $A \times B$ in every block are converted by the orthogonal transform circuit 17 into a sequence of coefficient signals which are representative of DCT coefficients resulting from the orthogonal transform and which are equal in number to $A \times B$.

Referring to FIG. 2(B), the DCT coefficients are arranged along a horizontal and a vertical direction which are related to frequencies of the DCT coefficients. In FIG. 2(B), the DCT coefficients are distributed from a low frequency region to a high frequency region along the horizontal and the vertical directions. Specifically, the DCT coefficient $F_{00}$ for a d.c. component is located at a leftmost and uppermost position in FIG. 2(B) while the DCT coefficients are shifted rightwards along the horizontal direction and downwards along the vertical direction as the frequencies for the DCT coefficiens become high. In this connection, a rightmost and uppermost position is assigned to the DCT coefficient for a horizontal maximum frequency along the horizontal direction while a leftmost and lowermost position is assigned to the DCT coefficient for a vertical maximum frequency. From this fact, it is readily understood that a rightmost and lowermost position is assigned to the DCT coefficient having maximum frequencies along both the horizontal and the vertical directions.

The DCT coefficients are successively scanned from the leftmost and uppermost position rightwards along the horizontal direction and are thereafter vertically scanned downwards in the illustrated manner.

The coefficient signal sequence CF is delivered within every one of the predetermined intervals to both a coding section 20 and a coding control circuit 21. The coding section 20 has a plurality of coding characteristics and serves to code the coefficient signal sequence in accordance with a selected one of the coding characteristics into a sequence of coded signals which is transmitted through the transmission line 13 at a predetermined transmission rate. In the example being illustrated, the coding characteristics may be considered quantization characteristics. For the time being, it suffices to say that the coding control circuit 21 serves to determine either one of the coding characteristics as the selected coding characteristic by monitoring an amount of information carried by the coefficient signal sequence in the respective predetermined intervals and by producing a coding control signal CD representative of the amount of information. In other words, the coding control signal CD specifies the number of the selected coding characteristic when consecutive numbers are assigned to the respective coding characteristics, as will become clear as the description proceeds.

The coding section 20 comprises a delay circuit 22 for delaying the coefficient signal sequence during a delay time equal to each of the predetermined intervals of time, namely, the single frame. The delay time of the delay circuit 22 is selected in consideration of an operation delay of the coding control circuit 21. At any rate, the delay circuit 22 serves to compensate for the operation delay of the coding control circuit 21 and to produce a delayed coefficient signal sequence.

The delayed coefficient signal sequence and the coding control signal CD are supplied to a quantization circuit 23 which has a plurality of quantization characteristics as the coding characteristics. The quantization circuit 23 quantizes the delayed coefficient signal sequence into a sequence of quantized signals in accordance with a selected one of the quantization characteristics that is indicated by the coding control signal CD. The quantized signals carry quantized coefficients which may be called quantization indices, respectively. Each of the quantization indices takes either a zero value or a non-zero value. The quantization index may be called a significant and nonsignificant quantization index when the quantization index takes the non-zero and the zero values, respectively.

Referring to FIG. 3 together with FIG. 1, the illustrated quantization circuit 23 has first through eighth ones No. 1 to No. 8 of the quantization characteristics that are depicted in FIGS. 3(A) to 3(H), respectively, and that have characteristic numbers from unity to eight, respectively. In FIGS. 3(A) to 3(H), the delayed coefficient signal sequence is taken along abscissae as inputs while the quantized signal sequence is taken along ordinates as outputs. A quantization step of each quantization characteristic becomes large from the first quantization characteristic (FIG. 3(A)) towards the eighth quantization characteristic (FIG. 3(H)). Accordingly, finest quantization is carried out in FIG. 3(A) while coarsest quantization is carried in FIG. 3(H).

The quantized signal sequence is delivered from the quantization circuit 23 to a block detection circuit 26 for determining whether each block is valid or invalid. In this event, the block detection circuit 26 judges the block in question to be valid even when a single one of the non-zero values is detected in the block in question. In other words, the block in question is judged to be invalid only when all the quantized signals take the zero values in the block in question. The block detection circuit 26 produces, as a result of judgement, a valid block signal and an invalid block signal when the block is valid and invalid, respectively. Such valid and invalid block signals are sent to a first variable length coding circuit 27. The first variable length coding circuit 27 produces first variable length codes of, for example, "01" and "1" in response to the valid and the invalid block signals, respectively.

On the other hand, the quantized signal sequence is also delivered to a scanning conversion circuit 28 for relocating or rearranging the order of the quantized signal sequence in a manner to be described below. The scanning conversion circuit 28 comprises a conversion memory (not shown) and a conversion address controller (not shown also) like the block division circuit 16. The quantized signal sequence is successively stored in the conversion memory in a manner mentioned in conjunction with FIG. 2(B) to be read out of the conversion memory in different order under control of the conversion address controller.

Referring to FIG. 2(C), it is assumed that the quantization indices are stored in the conversion memory, as shown in FIG. 2(C) and that significant ones of the quantization indices are depicted at black spots while nonsignificant ones of the quantization indices are depicted at white spots. Under the circumstances, oblique or zigzag scanning is carried out about the quantization indices in the illustrated manner by the conversion address controller.

Such zigzag scanning of the quantization indices is helpful to improve coding efficiency. More particularly, significant ones of the DCT coefficients, namely, the quantization indices tend to be concentrated in a d.c. region and low frequency regions along the horizontal and the vertical directions. On the other hand, such zigzag scanning is progressive from the d.c. region towards higher frequency regions with time. Therefore, zigzag scanning results in an increasing probability that nonsignificant quantization indices are scanned with time.

In FIG. 2(C), a final significant one of the quantization indices is depicted at an encircled black spot. This shows that the final significant quantization indices is followed by nonsignificant ones of the quantization indices. Accordingly, the nonsignificant quantization indices may not be coded after the final significant quantization index when a specific code is added after the final significant quantizattion index so as to distinguish the final significant quantization index from the other indices.

As a result, the zigzag scanning dispenses with superfluous coding of nonsignificant quantization indices and serves to reduce an amount of information to be coded.

In addition, a lot of nonsignificant quantization indices are dispersed from the d.c. region to high frequency regions. The coding efficiency is greatly improved by coding each nonsignificant quantization index by the use of a runlength coding method.

Thus, the scanning conversion circuit 28 rearranges the quantized signal sequence into a sequence of rearranged signals by the above-mentioned zigzag scanning and supplies the rearranged signal sequence to a second variable length coding circuit 29.

The second variable length coding circuit 29 carries out variable length coding of each quantization index or quantized signal to produce a second variable length code. Such a second variable length code is produced by assigning a predetermined pattern to each quantization index.

Referring to FIG. 4, the quantization indices or quantized signals can represent values between +69 and −69, both inclusive, together with an end of block (EOB), as shown in the leftmost column of FIG. 4. In this case, each of the quantization indices is made to correspond to each code which is shown in the intermediate column of FIG. 4. The codes have bit lengths of sixteen bits at maximum, as shown in the rightmost column of FIG. 4. Thus, the quantization indices are converted into the corresponding variable length codes. The conversion of the quantization indices into the variable length codes is possible by the use of a read-only memory (ROM) which memorizes the illustrated variable length codes. Such conversion may not be carried out about the quantization indices derived from the invalid block. This shows that the invalid block signal alone is produced without any quantization indices as regards each invalid block.

The first and the second variable length codes are multiplexed by a multiplexer 31 into a sequence of multiplexed signals. The multiplexed signal sequence is successively transmitted as the coded signal sequence at the predetermined transmission rate through a transmission buffer 32 and the transmission line 13 to the decoding system 12. The coded signal sequence may be further subjected to coding and decoding in the transmission line 13 to convert the coded signal sequence into a predetermined signal of, for example, AMI (Alternate Mark Inversion Codes), B8ZS (Bipolar with 8 Zeros Substitution Codes).

It is possible to detect an amount of information stored in the transmission buffer 32 by monitoring a difference between a write-in address and a readout address. Such a difference may be fed back to the coding control circuit 21 to control an amount of information produced from the quantization circuit 23.

In FIG. 1, the decoding system 12 is supplied with the coded signal sequence through the transmission line 13 and decodes the coded signal sequence into a reproduction RIM of the image signal sequence IM by carrying out inverse or decoding operation relative to the coding system 11. In the decoding system 12, the coded signal sequence is successively stored in a reception buffer 33 at the predetermined transmission rate and is read out of the reception buffer 33 as a sequence of readout signals at a decoding rate to be sent to a demultiplexer 34. The readout signal sequence conveys the first variable length codes representative of either the valid block or the invalid block and the second variable length codes representative of the quantization indices illustrated in FIG. 4.

The demultiplexer 34 demultiplexes the readout signal sequence into first and second demultiplexed signals which carry the first and the second variable length codes, respectively, and which are delivered to first and second variable length decoders 36 and 37, respectively. The first variable length decoder 36 decodes the first demultiplexed signal into the first variable length codes which are indicative of either the valid block or the invalid block and which are produced as a first decoded signal. On detection of the invalid block, the first variable length decoder 36 successively supplies a switch circuit 38 with the first decoded signal of a quantization value representative of the nonsignificant quantization index during each block. On detection of the valid block, the first variable length decoder 36 interrupts production of the first decoded signal and supplies the second variable length decoder 37 with an enable signal.

Supplied with the second demultiplexed signal and the enable signal indicative of the valid block, the second variable length decoder 37 decodes the second demultiplexed signal into the second variable length codes which are representative of the quantization indices, as exemplified in FIG. 4, and which are produced as a second decoded signal. Inasmuch as the second decoded signal carries the quantization indices which result from the zigzag scanning as illustrated in FIG. 2(C), the quantization indices of the second decoded signal should be rearranged as shown in FIG. 2(B). For this purpose, the second decoded signal is delivered from the second variable length decoder 37 to a scan converter 39. As a result, the scan converter 39 supplies the switch circuit 38 with a sequence of rearranged coefficient signals which represent the quantization indices rearranged in the manner illustrated in FIG. 2(B).

Responsive to the first decoded signal sequence and the rearranged signal sequence, the switch circuit 38 selects either the first decoded signal sequence on reception of the invalid block or the rearranged signal sequence on reception of the valid block. At any rate, a selected one of the first decoded signal sequence and the rearranged signal sequence is delivered from the switch circuit 38 to a two-dimensional orthogonal inverse transform circuit 41 to be converted into image signals which are partitioned into the blocks in the manner illustrated in FIG. 2(A). The partitioned image signals are sent to a television scan circuit 42 to be subjected to scan conversion. As a result, the television scan circuit 42 produces the reproduction RIM of the image signals through a video output terminal 43.

In the coding and the decoding system 11 and 12 illustrated in FIG. 1, circuit elements can be implemented in a usual manner except the coding control circuit 21 included in the coding system 11. Therefore, the following description will be directed to the coding control circuit 21.

Figure 5:
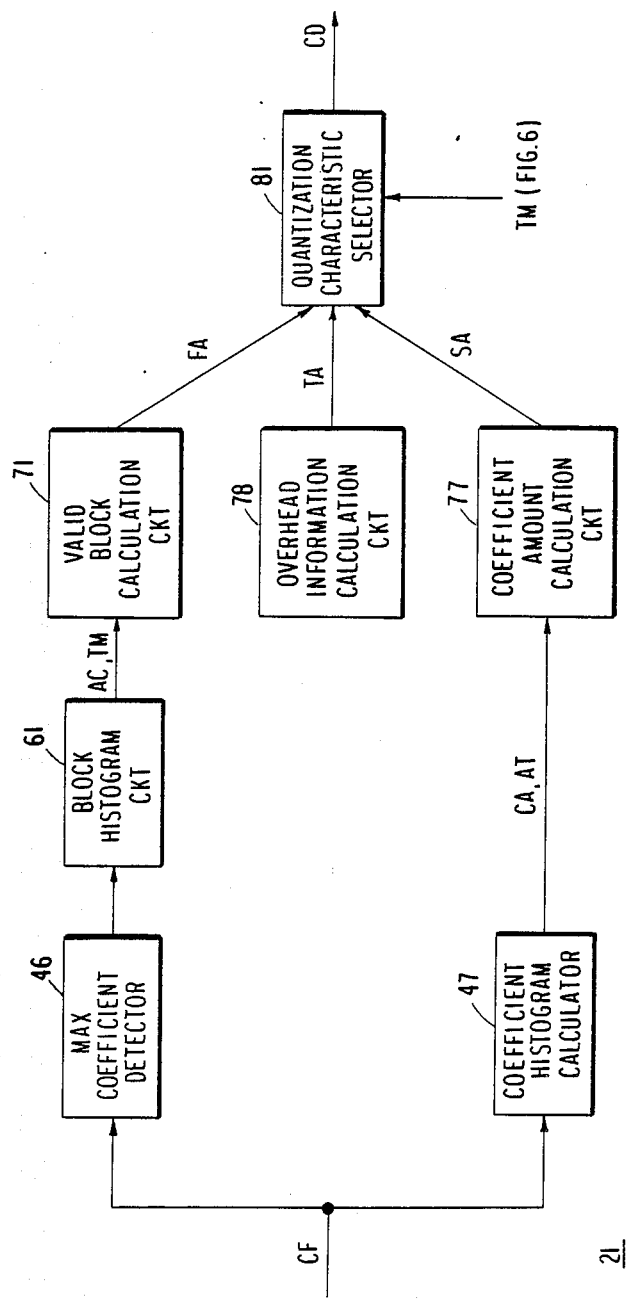
FIG. 5 is a block diagram of a coding control circuit used in the coding system illustrated in FIG. 1.

Referring to FIG. 5 in addition to FIG. 1, the coding control circuit 21 is supplied with the coefficient signal sequence CF to produce the coding control signal CD as mentioned before. In the illustrated example, the valid and the invalid block signals and the quantization indices are carried by the coded signal sequence, as described in conjunction with FIG. 1. In other words, an amount of information carried by the coded signal sequence is mainly dependent on amounts of the valid and the invalid block signals and the quantization indices. Accordingly, the amount of the valid and the invalid block signals is measured by the illustrated coding control circuit 21 as well as the amount of the quantization indices. Under the circumstances, the coefficient signal sequence CF is delivered to a maximum coefficient detector 46 and a coefficient histogram calculator 47 in parallel so as to measure and estimate the amounts of the valid and the invalid block signals and the amounts of the quantization indices, respectively. The amounts of the valid and the invalid block signals may be called first amount of information while the amounts of the quantization indices may be called second amounts of information.

At first, the maximum coefficient detector 46 successively detects a maximum one of the DCT coefficients in each block which is formed by the DCT coefficients equal in number to A×B. Such detection of the maximum coefficient can be carried out at every one of the blocks in a manner to be described later.

Figure 6:
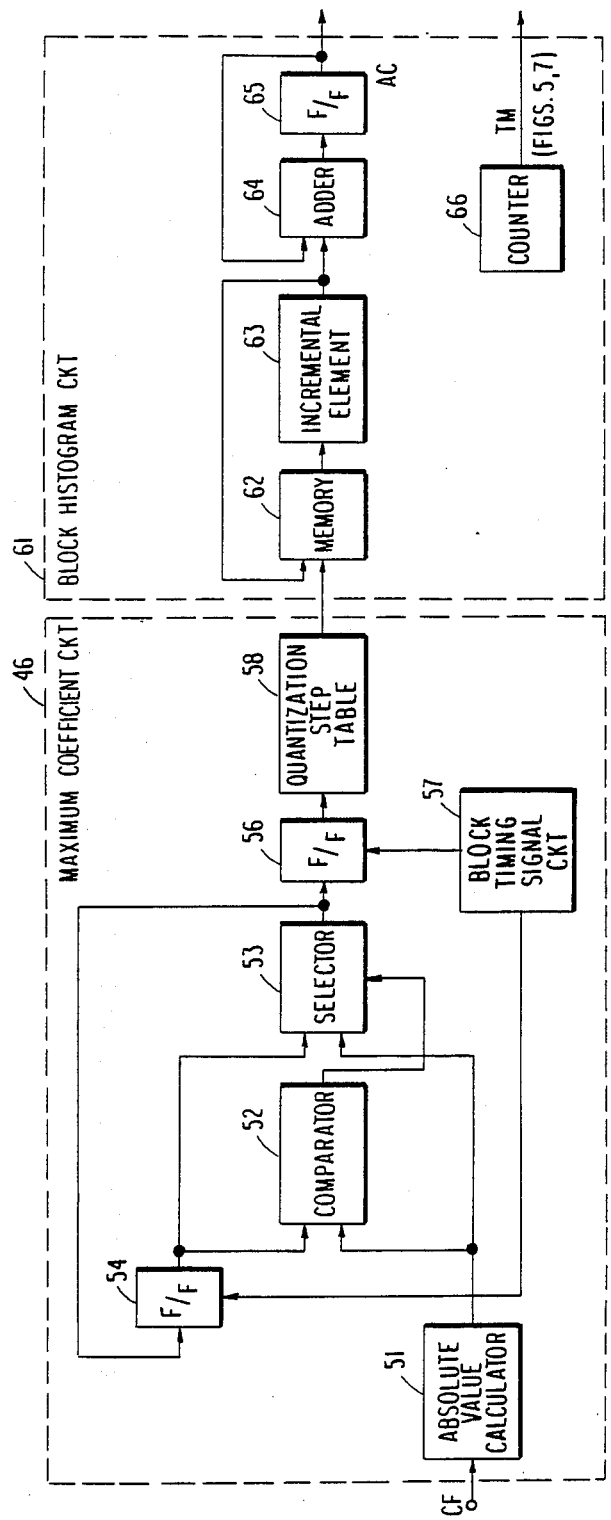
FIG. 6 is a block diagram of a part of the coding control circuit illustrated in FIG. 5.

Referring to FIG. 6 together with FIG. 5, the maximum coefficient detector 46 comprises an absolute value calculator 51 for calculating an absolute value of each DCT coefficient in response to the coefficient signal sequence CF to successively produce an absolute value signal representative of the absolute value. The absolute value signal is delivered from the absolute value calculator 51 to both a comparator 52 and a selector 53. Supplied with a previous maximum value stored in a first flip flop circuit 54, the comparator 52 compares the absolute value with the previous maximum value to produce a comparison result signal representative of a result of comparison. The result of comparison is indicative of the fact that the absolute value is greater or not greater than the previous maximum value. The comparison result signal is sent to the selector 53 which is given the previous maximum value and the absolute value. A greater one of the previous maximum value and the absolute value is selected by the selector 53 in response to the comparison result signal and is sent as a current maximum value to the first flip flop circuit 54 on one hand and to a second flip flop circuit 56 on the other hand. The first flip flop circuit 54 is loaded with the current maximum value and is reset by a block timing signal circuit 57 at every block. Therefore, the first flip flop circuit 54 keeps a maximum one of the absolute values in each block. The maximum absolute value is latched in the second flip flop circuit 56 in response to a block timing signal given from the block timing signal circuit 57. Thus, a single one of the maximum absolute values is sent at every block to a quantization step table 58 which stores first species data signals specifying the first through eighth quantization characteristics No. 1 to No. 8 illustrated in FIGS. 3(A) to (H) and which may be a read-only memory (ROM). The species data signals may represent the characteristic numbers assigned to the first through eighth quantization characteristics.

In this event, each of the maximum absolute values may be made to correspond to the quantization steps of the first through eighth quantization characteristics No. 1 to No. 8. The quantization steps may be recognized as minimum quantization steps, respectively, when the quantization steps are varied in each of the first through eighth quantization characteristics. Accordingly, it is possible to indicate which one of the quantization steps each maximum absolute value exceeds. In other words, each maximum absolute value indicates either one of the quantization steps that is produced as the first species data signal from the quantization step table 58. Thus, the maximum coefficient detector 46 serves to judge whether or not the blocks are valid in the respective predetermined intervals in relation to the quantization characteristics No. 1 to No. 8 to produce the first species data signals representative of results of judgement.

In FIGS. 5 and 6, the first species data signal is successively sent at every block from the quantization step table 58 of the maximum coefficient detector 46 to a block histogram circuit 61. The block histogram circuit 61 comprises a memory 62 accessed by the species data signal which may be considered an address signal. The memory 62 has a plurality of addresses which correspond to the first through eighth quantization characteristics and which store frequencies of occurrence, namely, counts in response to the first species data signal.

It is assumed that first through eighth addresses are assigned to the first through eighth quantization characteristics, respectively. For example, when the first species data signal indicates the eighth quantization characteristic No. 8, a previous content or count is read out of the address specified by the first species data signal and is sent to an incremental element 63 to be counted up by one. Thus, the incremental element 63 sums up the previous count and unity to produce a sum signal representative of the sum. The sum signal is fed back to the memory 62 and is written as a current content into the address specified by the species data signal. Thus, the current content is substituted for the previous content. Similar operation is successively carried out for every one of the predetermined intervals of time.

As a result, a histogram is formed about the maximum coefficients in the memory 62 in relation to the first through eighth quantization characteristics No. 1 to No. 8 in every one of the predetermined intervals of time and will be referred to as a first partial histogram which is representative of a first distribution of valid and invalid blocks. After formation of the first partial histogram, the content is at first read out of the eighth address for the eighth quantization characteristic No. 8 and is sent to an adder 64 connected to a third flip flop circuit 65. The third flip flop circuit 65 initially keeps zero as a result of accumulation. Therefore, the third flip flop circuit 65 is supplied with the content read out of the eighth address through the adder 65 as a first result of accumulation. Subsequently, the content is read out of the seventh address of the memory 62. In this case, the content of the seventh address is added by the adder 64 to the content of the eighth address. A sum of the contents stored in the eighth and the seventh addresses is stored as a second result of accumulation in the third flip flop circuit 65 and may correspond to an amount of information, namely, an estimated number of the valid blocks appearing on quantization due to the seventh quantization characteristic No. 7.

Thereafter, the contents of the eighth, seventh, and sixth addresses are added by the adder 64 to one another in the above-mentioned manner to be stored in the third flip flop circuit 65 as a third result of accumulation. Similarly, fourth through eighth results of accumulation are successively kept in the third flip flop circuit 65 when the contents are read out of the fifth through first addresses, respectively.

The first through eighth results of accumulation specify the first partial histogram and are produced as a first partial histogram signal representative of estimated numbers of the valid blocks appearing on quantization based on the eighth through first quantization characteristics No. 8 to No. 1. The first partial histogram signal may be called a block accumulation result signal AC and is synchronized with first through eighth timing signals which are produced from a counter 66. The first through eighth timing signals TM are assigned to the eighth through first quantization characteristics No. 8 to No. 1, respectively, and will be called quantization number signals representative of the characteristic numbers of the eighth through first quantization characteristics No. 8 to No. 1.

In FIG. 5, the block accumulation result signal AC and the timing signals TM are sent to a first calculation circuit 71 for successively calculating the first amounts of information in relation to the eighth through first quantization characteristics No. 1 to No. 8. In this event, valid and invalid code lengths are determined for a single valid block and a single invalid block in the first calculation circuit 71, respectively. Inasmuch as each result of accumulation is representative of the number of the valid blocks and a total number of the blocks is determined in each of the predetermined intervals, the number of the invalid blocks can be calculated in the first calculation circuit 71 by subtracting the number of the valid blocks from the total number of the blocks. Under the circumstances, the valid and the invalid code lengths are multiplexed by the numbers of the valid and the invalid blocks in relation to each of the eighth through first quantization characteristics No. 8 to No. 1. Thus, amounts of information are calculated for the eighth through first quantization characteristics to specify the valid and the invalid blocks and are produced as a first amount signal FA.

Further referring to FIG. 5, the coefficient histogram calculator 47 is supplied with the coefficient signal sequence CF and is similar in structure and operation to a combination of the maximum coefficient detector 46 and the histogram circuit 61 except that no maximum coefficient is detected in the coefficient histogram calculator 47. In this connection, each coefficient of the coefficient signal sequence CF may be sent to a quantization step table, such as 58 in FIG. 6, through an absolute value calculator, such as 51. As a result, the coefficient histogram circuit 47 forms a second partial histogram related to the coefficients within every one of the predetermined intervals of time, in a manner to be described in conjunction with FIG. 6. This shows that the coefficients are successively accumulated in the coefficient histogram calculator 47 in relation to the eighth through first quantization characteristics No. 8 to No. 1 in each of the predetermined intervals. As a result, first through eighth results of coefficient accumulation are produced as a coefficient accumulation result signal CA from the coefficient histogram calculator 47 in a manner similar to the block accumulation result signal AC. The coefficient accumulation result signal CA is sent as a second partial histogram signal to a second calculation circuit 77 in synchronism with first through eighth additional timing signals AT corresponding to the eighth through first quantization characteristics No. 8 to No. 1, respectively. The first through eighth additional timing signals are synchronized with the first through eighth timing signals, respectively.

The first and the second partial histogram signals may collectively be named a histogram signal representative of a combination of the first and the second partial histograms. In this connection, the maximum coefficient detector 46, the block histogram circuit 61, and the coefficient histogram calculator 47 may be referred to as a histogram forming circuit.

In the second calculation circuit 77, an average code length is determined for the valid coefficients while an invalid coefficient code length is also determined for the invalid coefficients. The average code length is multiplied in the second calculation circuit 77 by the first through eighth results of coefficient accumulation to obtain amounts of the valid coefficients in relation to the eighth through first quantization characteristics, respectively. Likewise, the invalid coefficient code length is multiplied by numbers of the invalid coefficients to obtain amounts of the invalid coefficients in relation to the eighth through first quantization characteristics, respectively. At any rate, the amounts of the valid and the invalid coefficients are produced from the second calculation circuit 77 as a second amount signal SA.

In the example being illustrated, an additional amount of information is calculated by a third calculation circuit 78 and produced as a third amount signal TA. Such information may be, for example, overhead information necessary for classification on adaptive control. The third calculation circuit 78 may therefore be called an overhead information calculation circuit.

The first through third amount signals are supplied to a quantization characteristic selector 81 from the first through third calculation circuits 71, 77, and 78, respectively.

Figure 7:
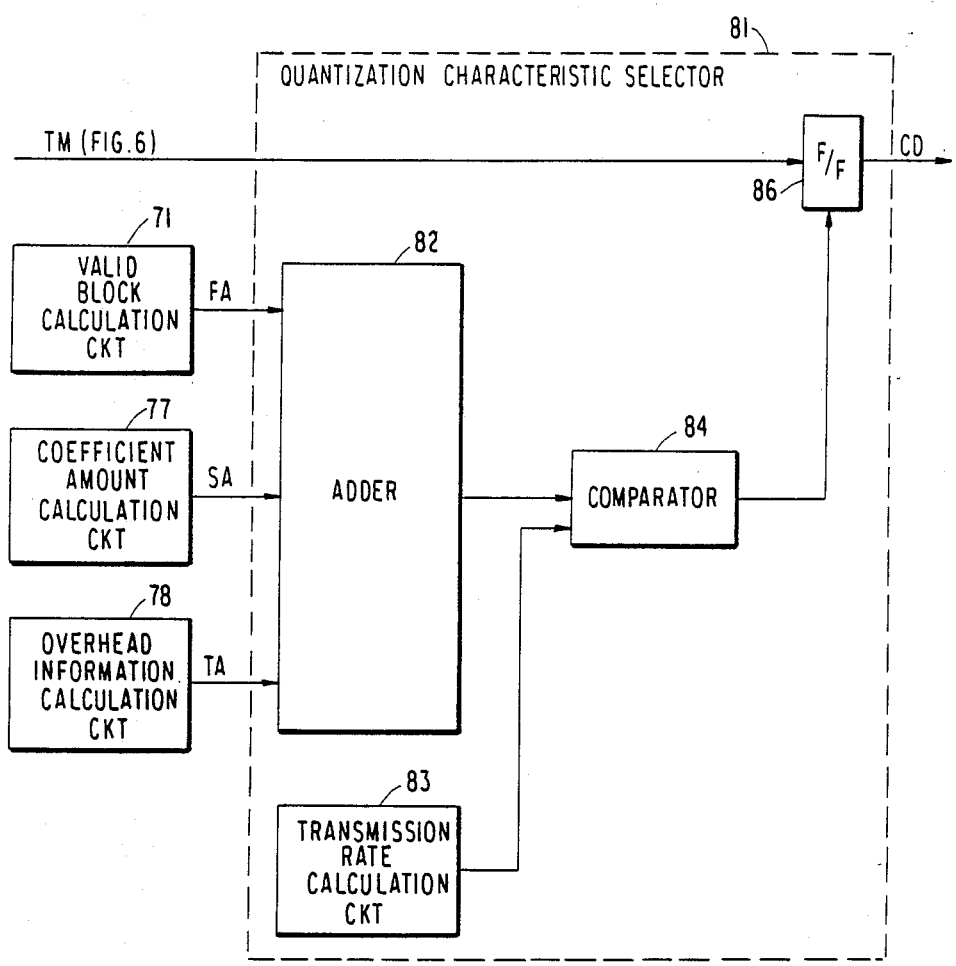
FIG. 7 is a block diagram of another part of the coding control circuit illustrated in FIG. 5.

Referring to FIG. 7 in addition to FIG. 5, the quantization character selector 81 is supplied with the timing signals TM from the counter 66 (FIG. 6). The timing signals TM are indicative of the characteristic numbers of the eighth through first quantization characteristics No. 8 to No. 1 and given to the quantization characteristic selector 81 in synchronism with the first through third amount signals FA, SA, and TA. The first through third amount signals FA, SA, and TA are summed up by an adder circuit 82 to successively calculate total amounts of information in relation to each of the eighth through first quantization characteristics to produce total amount signals in synchronism with the eighth through first timing signals TM, respectively.

The illustrated quantization characteristic selector 81 comprises a transmission rate calculation circuit 83 for producing a reference amount signal representative of a reference amount of information which can be transmitted at the transmission rate within every one of the predetermined intervals through the transmission line 13. The reference amount of information may be, for example, 10k bits for each frame when thirty frames are transmitted at the transmission rate of 300k bits/sec.

A comparator 84 successively compares each of the total amount signals with the reference amount signal to produce a local timing signal on detection of the nearest one of the total amounts to the reference amount. Responsive to the local timing signal, an output flip flop 86 is enabled to store one of the eighth through first timing signals TM that is received on production of the local timing signal. As a result, either one of the eighth through first quantization numbers is kept in the output flip flop 86 and is produced as the coding control signal CD. Thus, the coding control signal CD estimates the amount of information in each predetermined interval and may be referred to as an estimation signal. In this connection, a combination of the first through third calculation circuits 71, 77, and 78 and the quantization characteristic selector 81 is operable to produce the estimation signal in response to the first and the second partial histogram signals and may be referred to as an estimation circuit.

In the above-mentioned manner, one of the quantization characteristics is selected by the coding control circuit 21 in every one of the predetermined intervals. This shows that the quantization characteristics are selected on coding in accordance with the total amount of information carried within each frame. In other words, such selection of the quantization characteristics is possible within every frame irrespective of the next following frame. Accordingly, scene shift or scene control can favorably or stably be controlled without adverse influence to a following frame. Moreover, stable control is carried out by selecting an identical one of the quantization characteristics for a long time and enables improvement of a quality of a reproduced picture.

While this invention has thus far been described in conjunction with a preferred embodiment thereof, it will readily be possible for those skilled in the art to put this invention into practice in various other manners. For example, each predetermined interval of time may be a field duration. Orthogonal transform may be, for example, Hadamard transform, Fourier transform, Slant transform, or K-L transform. In addition, the histogram may be formed only about the coefficients. The image signals may be directly be counted by the coding control circuit 21 to form a histogram of the image signals. In this event, the coding control circuit 21 illustrated in FIG. 5 may be supplied with the image signal sequence IM instead of with the coefficient signal sequence. The image signal sequence IM may be a sequence of predictive error signals.

What is claimed is:

1. In an image coding system for use in coding a sequence of digital image signals into a sequence of coded signals, said digital image signal sequence being divisible into predetermined intervals of time, said image coding system comprising dividing means responsive to said digital image signal sequence for dividing said digital image signal sequence into a sequence of blocks within each of said predetermined intervals, converting means coupled to said dividing means for successively carrying out predetermined conversion of the digital image signals of said blocks in each predetermined interval to produce a sequence of coefficient signals representative of coefficients resulting from said predetermined conversion, controllable coding means which has a plurality of coding characteristics and which is responsive to said coefficient signal sequence and to a characteristic selection signal for coding said coefficient signal sequence into said coded signal sequence in accordance with a selected one of said coding characteristics that is indicated by said characteristic selection signal, coding control means responsive to said coefficient signal sequence for producing a coding control signal determined in relation to an amount of information carried by said coefficient signal sequence, and supplying means for supplying said coding control signal to said controllable coding means as said characteristic selection signal, the improvement wherein said coding control means comprises:

histogram forming means responsive to the coefficient signal sequence for forming a histogram representative of a distribution of said coefficients in each predetermined interval, said histogram forming means producing a histogram signal representative of said histogram; and estimating means coupled to said histogram forming means and responsive to said histogram signal for estimating the amount of information carried by the coefficient signal sequence in every one of said predetermined intervals to produce, as said coding control signal, an estimation signal representative of a result of the estimation in every one of said predetermined intervals.

2. An image coding system as claimed in claim 1, wherein the blocks are divided into valid and invalid ones depending on whether coefficient signals representative of non-zero coefficients are contained in the coefficient signals of each block while the coefficient signals are also divided into valid and invalid ones depending on whether they represent non-zero coefficients, and wherein said histogram forming means comprises:

first partial histogram forming means responsive to said coefficient signal sequence for forming a first partial histogram related to the valid and invalid ones of said blocks in every one of said predetermined intervals to produce a first partial histogram signal representative of said first partial histogram;

second partial histogram forming means responsive to said produce a second partial histogram signal representative of said second partial histogram; and means for delivering said first and said second partial histogram signals as said histogram signal to said estimating means.

3. An image coding system as claimed in claim 2, wherein said controllable coding means comprises:

quantization means which has a plurality of quantization characteristics as said plurality of coding characteristics, and which is responsive to said coefficient signal sequence and said estimation signal, said quantization means being for quantizing said coefficient signal sequence into a sequence of quantized signals in accordance with a selected one of said quantization characteristics indicated as said selected one of said coding characteristics by said estimation signal; and variable length coding means coupled to said quantization means for carrying out variable length coding of said quantized signal sequence into said coded signal sequence.

4. In an image coding system for use in coding a sequence of digital image signals into a sequence of coded signals, said digital image signal sequence being divisible into predetermined intervals of time, said image coding system comprising dividing means responsive to said digital image signal sequence for dividing said digital image signal sequence into a sequence of blocks within each of said predetermined intervals, controllable coding means which has a plurality of coding characteristics and which is responsive to said digital image signal sequence and to a characteristic selection signal for coding said digital image signal sequence into said coded signal sequence in accordance with a selected one of said coding characteristics that is indicated by said characteristic selection signal, coding control means responsive to said digital image signal sequence for producing a coding control signal determined in relation to an amount of information carried by said digital image signal sequence, and supplying means for supplying said coding control signal to said controllable coding means as said characteristic selection signal, the improvement wherein said coding control means comprises:
histogram forming means responsive to the digital image signal sequence for forming a histogram representative of a distribution of said digital image signals in each of said predetermined intervals, said histogram forming means producing a histogram signal representative of said histogram; and
estimating means coupled to said histogram forming means and responsive to said histogram signal for estimating the amount of information carried by the digital image signal sequence in every one of said predetermined intervals to produce, as said coding control signal, an estimation signal representative of a result of the estimation in every one of said predetermined intervals.

5. An image decoding system for use in combination with a coding system which produces a sequence of coded signals by dividing a sequence of digital image signals into a sequence of blocks in every one of predetermined intervals of time, by carrying out predetermined conversion of the digital image signals of the blocks in every one of said predetermined intervals into a sequence of coefficient signals which are representative of coefficients resulting from said predeterimined conversion, by forming a histogram representing an amount of information carried by said coefficient signal sequence and producing a histogram signal representative of said histogram, and by coding said coefficient signal sequence into said coded signal sequence in accordance with said histogram signal, said image decoding system comprising:
decoding means for decoding said coded signal sequence into a reproduction of said coefficient signal sequence; and
inverse conversion means coupled to said decoding means for carrying out inverse conversion of said reproduction of said coefficient signal sequence relative to said predetermined conversion to produce a reproduction of said sequence of digital image signals.

* * * * *

UNITED STATES PATENT AND TRADEMARK OFFICE
CERTIFICATE OF CORRECTION

PATENT NO. : 4,920,426

DATED : April 24, 1990

INVENTOR(S) : Yoshinori Hatori, et al

It is certified that error appears in the above-identified patent and that said Letters Patent is hereby corrected as shown below:

Col. 14, line 26, after "said" insert --coefficient signal sequence for forming a second partial histogram related to the valid and the invalid ones of said coefficient signals in every one of said predetermined intervals to--.

Signed and Sealed this

Third Day of March, 1992

Attest:

HARRY F. MANBECK, JR.

*Attesting Officer*     *Commissioner of Patents and Trademarks*